United States Patent [19]

Garner

[11] Patent Number: 4,547,570
[45] Date of Patent: Oct. 15, 1985

[54] PROCESS FOR PREPARING CELLULOSE ETHERS

[75] Inventor: Joseph L. Garner, Sanford, Mich.

[73] Assignee: The Dow Chemical Company, Midland, Mich.

[21] Appl. No.: 543,693

[22] Filed: Oct. 20, 1983

[51] Int. Cl.$^4$ .................. C08B 11/00; C08B 11/02
[52] U.S. Cl. .................................. 536/84; 536/99; 536/100
[58] Field of Search ................ 536/84, 99, 100

[56] References Cited

U.S. PATENT DOCUMENTS

| | | | |
|---|---|---|---|
| 1,683,682 | 9/1928 | Lilienfeld | 536/100 |
| 1,694,127 | 12/1928 | Leuchs et al. | 536/100 |
| 1,746,663 | 2/1930 | Leuchs | 536/100 |
| 2,137,343 | 11/1938 | Maxwell | 536/99 |
| 2,145,273 | 1/1939 | Peterson et al. | 536/100 |
| 2,254,249 | 9/1941 | Swinehart et al. | 536/100 |
| 2,284,860 | 6/1942 | Färber | 536/99 |
| 2,362,900 | 11/1944 | Groombridge et al. | 536/100 |
| 2,512,338 | 6/1950 | Klug et al. | 536/100 |
| 3,903,076 | 9/1975 | Krumel et al. | 536/84 |
| 4,250,305 | 2/1981 | Saito et al. | 536/84 |
| 4,339,574 | 7/1982 | Wüst et al. | 536/84 |
| 4,341,892 | 7/1982 | Kühne et al. | 536/101 |

Primary Examiner—Ronald W. Griffin

[57] ABSTRACT

Improved reaction efficiencies are obtained when water is removed during a reaction of alkali cellulose and an etherifying agent to produce cellulose ethers. The removal of water during the etherification reaction reduces the amount of by-products formed during the reaction.

15 Claims, No Drawings

PROCESS FOR PREPARING CELLULOSE ETHERS

BACKGROUND OF THE INVENTION

This invention relates to a process for preparing cellulose ethers.

Cellulose ethers are conventionally prepared by the reaction of alkali cellulose with diverse etherifying agents. The alkali cellulose employed is generally prepared from cellulose and an alkali metal hydroxide. The alkali metal hydroxide must be added to the cellulose as a concentrated aqueous solution in order to distribute the alkali metal hydroxide through the cellulose. Unfortunately, many etherifying agents react with water under the conditions of the etherification reaction to form undesirable by-products. Such side reactions cause the waste of substantial quantities of etherifying agent. Typically, as much as 70 percent of the etherifying agent used in the etherifying reaction goes to form such by-products. These by-products must then be removed from the product and recovered, thus adding additional expense to the process.

In British Pat. No. 546,647, it was attempted to improve the efficiency of cellulose etherification reactions by employing substantially anhydrous alkali cellulose as the starting material. The anhydrous alkali cellulose is prepared by mixing cellulose with an aqueous sodium hydroxide solution in the presence of an organic diluent and then distilling an azeotropic mixture of water and diluent under reduced pressure and moderate, i.e., 40°-60° C., temperatures. Unfortunately, however, said process adds significantly to the total time required for the etherification process and does not improve the efficiency of the etherification reaction as much as desired.

Similarly, in U.S. Pat. No. 4,341,892, it is taught to prepare alkali cellulose having a low water content by suspending cellulose in an organic solvent and contacting the suspension with an alkali metal hydroxide/alcohol mixture and an aqueous alkali metal hydroxide solution. Part of the water and all of the alcohol are subsequently distilled, forming a low water alkali cellulose. This process, however, requires substantial amounts of time and energy and the use of an extra organic reagent, all of which add substantially to the expense of the overall etherification process. Accordingly, it would be highly desirable to have a process whereby the etherification of cellulose is conducted with higher efficiency and which does not have the drawbacks associated with prior methods.

SUMMARY OF THE INVENTION

This invention is such an improved process. The present invention is an improvement in etherification reaction for preparing cellulose ethers wherein an alkali cellulose is reacted with an etherifying agent which also reacts with water. The improvement comprises removing water during the etherification reaction, whereby the efficiency of the etherification reaction is improved as compared to a similar etherification reaction in which water is not removed.

Greatly improved reaction efficiencies are obtained in the practice of this invention. The process of this invention yields reaction efficiencies of 50-70 percent or higher, as compared to efficiencies of 30-40 percent which are typically obtained using conventional processes. Surprisingly, it has also been found that the properties of the cellulose ether prepared by the present process are substantially unchanged, i.e. the product has substantially the same properties as a corresponding ether which is prepared by conventional process. In addition, the improved process of this invention does not add significantly to the time, energy or reagents employed in conventional processes.

DETAILED DESCRIPTION OF THE INVENTION

This invention is useful in the preparation of diverse ethers of cellulose which are prepared by the reaction of alkali cellulose with an etherifying agent which also reacts with water under the conditions of the etherification reaction. Suitable etherifying agents include alkylating agents such as alkyl halides or dialkyl sulfates; hydroxyalkylating agents such as alkylene oxides; carboxyalkylating agents such as halo-substituted aliphatic carboxylic acids or salts thereof; and other known compounds which react with alkali cellulose to form ethers and with water to form by-products. Because alkyl halides and halo-substituted aliphatic carboxylic acids or their salts are especially reactive with water under the conditions of the etherification reaction, this invention is especially suitable when such materials are employed as etherifying agents. Preferably, the etherifying agent is a $C_1$-$C_4$ alkyl halide, especially $C_1$-$C_2$ alkyl chloride; or other etherifying agent which consumes caustic in its reaction with alkali cellulose. The etherifying agents described herein may contain diverse substituent groups or unsaturation and the like as long as such groups or unsaturation do not substantially interfere with the etherification reaction. In addition, mixtures of etherifying agents may be employed herein as desired.

The etherifying agent is reacted with alkali cellulose in the process of this invention. "Alkali cellulose" as that term is used herein, refers to a mixture of cellulose and an alkali metal hydroxide. Alkali cellulose is prepared by combining cellulose with a concentrated aqueous solution of the alkali metal hydroxide, preferably under conditions such the alkali metal hydroxide solution is more or less uniformly distributed throughout the cellulose. The amount of alkali metal hydroxide employed is that amount which is sufficient to break up the crystallinity of the cellulose and to impart the desired amount of substituent ether groups to the cellulose. In general, from about 0.15 to about 4 parts by weight of alkali metal hydroxide per part by weight of cellulose is employed.

As mentioned hereinbefore, the alkali metal hydroxide is employed as a concentrated aqueous solution. Such aqueous solution preferably contains at least 50 weight percent and more preferably about 73 weight percent of sodium hydroxide. Less concentrated alkali metal hydroxide solutions bring excess water into the reaction medium, while more concentrated alkali metal hydroxide solutions have very high melting points and are therefore difficult to use. More preferably, a 73 weight percent sodium hydroxide solution is employed in the preparation of alkali cellulose, which solution contains from about 0.8 to about 3.0 parts by weight of alkali metal hydroxide per part by weight of cellulose pulp. Additional anhydrous alkali metal hydroxide may be added to the reaction mixture during the etherification reaction, if desired. In such case, water formed during the etherification reaction is employed to melt and dissolve said anhydrous alkali metal hydroxide.

The etherification reaction is carried out under conditions such that water is removed from the reaction mixture as the etherification reaction progresses. In general, the etherification reaction is carried out under conditions of temperature and pressure such that water, or if a diluent is employed, an azeotrope containing water, is distilled from the reaction materials. The particular reaction conditions employed will depend on factors such as the diluent employed, if any, the amount of water to be removed, the particular etherifying agent to be employed, and the desired rate of water removal.

The temperature employed in the etherification reaction is advantageously in the range from about 40° to about 180° C. or, more broadly, at least sufficient to conduct the etherification and distillation and sufficiently low that the cellulose is not substantially thermally degraded. When temperatures below 100° C. are employed, subatmospheric pressures or an organic diluent which forms an azeotrope with water which boils below 100° C. are employed to facilitate the removal of water. Preferably, the etherification reaction is conducted at a temperature of at least 100° C. and preferably in the range from 120°-160° C.

When gaseous etherification reactants such as methyl chloride, ethyl chloride, ethylene oxide or propylene oxide are employed, the reaction is most advantageously conducted under superatmospheric pressure in order to increase the rate and degree of etherification reaction. When such gaseous etherifying agents are employed, it is therefore highly preferred to conduct the etherification at a temperature above 100° C. so that subatmospheric pressures are not required to remove water.

The reaction may be carried out as a dry process, i.e., in the absence of an inert or organic diluent. However, heat removal at temperatures above 100° C. is a problem in said dry process. It is therefore preferred to employ an inert organic diluent for heat exchange purposes. Advantageously, but not necessarily, the organic diluent employed forms an azeotropic mixture with water, which azeotrope can be distilled from the reaction mixture. Those organic diluents conventionally employed in the so-called "slurry" processes in preparing cellulose ethers such as methyl ethyl ketone, toluene, benzene acetone, t-butanol hexane, isopropanol and the like are advantageously employed herein. Preferably, the diluent is toluene, benzene or hexane. The amount of diluent employed is desirably sufficient to facilitate the transfer of heat to and from the reaction mixture.

Water is removed from the reaction mixture simultaneously with the reaction of the etherifying agent and the alkali cellulose. In general, the improved process of this invention is run by mixing the etherifying agent with alkali cellulose, heating the mixture to the desired temperature, and distilling water or an azeotrope containing water from the reaction mixture as the etherification reaction proceeds. It is recognized, however, that modifications of this procedure, such as the continuous addition of reagents over a period of time or the addition of the etherifying agent to alkali cellulose which is already at the reaction temperature, are suitably employed herein.

The water removed from the reaction mixture comes from at least two potential sources. Firstly, a certain quantity of water is added to the reaction mixture with the alkali cellulose. Secondly, water is formed in certain etherification reactions, particularly those between alkali cellulose and alkyl halides, dialkyl sulfates and halo-substituted aliphatic carboxylic acid. The amount of water removed in the process of this invention is at least sufficient to increase the efficiency of the etherification reaction. The "efficiency of the etherification reaction" is expressed herein as the percent of the etherifying agent consumed in the etherification reaction which reacts with the alkali cellulose rather than in side reactions. The amount of water removed is advantageously expressed as the ratio between the rate of water removed from the reaction mixture to the rate of water loaded into the reaction mixture with the alkali cellulose (herein $R_w$). Generally, greater efficiency of etherification reaction is seen when the $R_w$ is at least 0.3, preferably at least 0.6, more preferably at least 1.0. If water is formed during the etherification reaction, $R_w$ can, and preferably does, exceed 1.0. In general, a larger $R_w$ leads to a higher efficiency of the etherification reaction.

Water removed from the reaction mixture is not returned thereto. When azeotropic mixtures are distilled from the reaction mixture, the azeotrope may be discarded or condensed into separate organic and aqueous phases with the organic phase being recycled back into the reaction mixture, if desired. The handling of the material distilled from the reaction mixture is not considered critical to the invention.

The time required for the practice of this invention is advantageously not substantially in excess of that required to complete the etherification reaction. It has been found that excess reaction time tends to decrease the efficiency of the etherification reaction. While the precise time required for any particular etherification reaction depends on the particular conditions employed, the etherification reaction is generally completed in from about 1 to about 20, preferably from about 2 to about 8, hours.

Following the etherification reaction, the product is washed using water or a suitable organic solvent, dried, and converted to the desired physical form, i.e., powder or granular material. Hydroxyalkyl cellulose ethers may be crosslinked with glyoxal or other dialdehyde if desired. All such processes are well known to those skilled in the art and are not considered critical to the present invention.

In the practice of the present invention, efficiency of the etherification reaction is greatly increased as compared to the efficiencies of convention etherification reactions. Such increases in efficiencies are especially seen when the etherifying agent is an alkyl chloride, dialkyl sulfate, or other etherifying agent which consumes sodium hydroxide in its reaction with alkali cellulose.

In particular, the process of this invention is suitable in the preparation of ethylcellulose in a slurry process in the conventional slurry process used for preparing ethylcellulose, the efficiency of the ethylation reaction is typically in the range from about 30-40 percent. Using the process of this invention, the efficiency of the ethylation reaction can be increased to about 50-70 percent or higher. Due to such increased efficiencies, such etherification reactions of cellulose can often be conducted using smaller quantities of etherifying agents and shorter cycle times.

The products prepared using the process of this invention are, surprisingly, found to exhibit properties substantially the same as those corresponding products made by conventional processes. Products made by the present invention may be employed as, for example, thermoplastic materials, protective colloids, thickeners, suspending agents, emulsion stabilizers, and the like.

The following examples are intended to illustrate the invention but not to limit the scope thereof. All parts and percentages are by weight unless otherwise indicated.

EXAMPLE 1

To a Parr reactor equipped with a condenser, water trap and means to recycle distilled diluent, are added 810 g of toluene, 54 g of cellulose, 60 g of a 50 weight percent aqueous sodium hydroxide solution, 51 g of anhydrous sodium hydroxide and 191 g of ethyl chloride. The reactor is sealed. The ethylation reaction is carried out by heating the mixture to 140° C. for 6 hours. During the ethylation reaction, an azeotropic mixture of toluene and water is distilled from the reactor. This distillate is condensed and separated to aqueous and organic phases. The organic phase is cycled back into the reactor during the reaction. The water phase is not returned to the reactor. During the 4-hour ethylation reaction, 45.6 g of water are removed from the reaction vessel ($R_w = 45.6 \div 30 = 1.52$).

Following the ethylation reaction, the reactor is vented to remove unreacted ethyl chloride and cooled to below 100° C. A portion of the crude ethyl cellulose so prepared is analyzed for residual sodium hydroxide and sodium chloride. The remaining portion is granulated, neutralized, washed and dried.

The ethoxyl content of the product is determined to be 47.7 weight percent. The ethoxyl degree of substitution is calculated from the ethoxyl content to be 2.44. From the degree of substitution and the amounts of sodium hydroxide and sodium chloride contained in the crude ethyl cellulose, the efficiency of the ethyl chloride reaction is calculated as 55.8 percent. In other words, 55.8 percent of the ethyl chloride consumed in the reaction reacts with the cellulose to form the desired ether. The results obtained are summarized as Sample No. 1 in Table I following.

COMPARATIVE EXAMPLE C-1

The procedure described in Example 1 is repeated except this time water is not removed from the reactor during the ethylation reaction, i.e., $R_w$ equals zero. The resulting ethyl cellulose has an ethoxyl content of 44.4 percent and an ethoxyl degree of substitution of 2.21. The efficiency of the ethyl chloride reaction is determined to be 39 percent. These results are summarized as Sample No. C-1 in Table I following.

TABLE I

| Sample No. | $R_w$[1] | Etoxyl (%)[2] | Ethoxyl D.S.[3] | Ethyl Chloride Efficiency (%)[4] |
|---|---|---|---|---|
| 1 | 1.52 | 47.7 | 2.44 | 55.8 |
| C-1* | 0 | 44.4 | 2.21 | 39. |

*Not an example of the invention.
[1]$R_w$ equals weight ratio of water removed during the ethylation reaction to water loaded to the reactor with the reagent.
[2]Ethoxyl content of the dried product, expressed as a weight percent of the ethylcellulose.
[3]Ethoxyl degree of substitution equals the average number of ethoxyl groups per anhydroglucose unit of the ethylcellulose.
[4]Calculated as weight of ethyl chloride which is reacted with cellulose divided by the weight of ethylcellulose consumed in the reaction.

It can be seen from Table I that greatly improved ethyl chloride efficiencies are seen when water is removed during the ethylation reaction. In addition, the ethyl cellulose prepared in the process of this invention is more highly substituted. A lower substituted product as Comparative Example C-1 is readily prepared with the process of this invention by shortening the reaction time.

EXAMPLES 2-5 AND COMPARATIVE EXAMPLE C-2

The procedure described in Example 1 is repeated four times to prepare Sample Nos. 2-5, except that the weight ratio of sodium hydroxide to cellulose in each one is varied as indicated in Table II following. In each phase, the sodium hydroxide is added as an aqueous solution containing 73 percent sodium hydroxide. The results are as reported as Sample Nos. 2-5 in Table II following. For comparison, Sample No. C-2 is prepared using a 0.75 sodium hydroxide to cellulose ratio and no water removal. The results are indicated as Sample No. C-2 in Table II following.

TABLE II

| Sample No. | NaOH/Cellulose Ratio[1] | $R_w$[2] | Ethoxyl (%)[3] | Ethoxyl D.S.[4] | Ethyl Chloride Efficiency (%)[5] |
|---|---|---|---|---|---|
| 2 | 0.75 | 1.97 | 39.1 | 1.84 | 67.3 |
| 3 | 0.85 | 1.8 | 45.4 | 2.29 | 69.2 |
| 4 | 0.95 | 1.7 | 45.4 | 2.29 | 60.3 |
| 5 | 1.05 | 1.6 | 46.3 | 2.34 | 56.2 |
| C-2* | 0.75 | 0 | 34.9 | 1.60 | 52.2 |

*Not an example of the invention.
[1]Weight ratios of sodium hydroxide (as anhydrous NaOH) to cellulose loaded to the reactor.
[2]Same as [1] in Table I.
[3]Same as [2] in Table I.
[4]Same as [3] in Table I.
[5]Same as [4] in Table I.

As can be seen from Table II, very high ethyl chloride efficiencies are seen in the process of this invention. In addition, the products so obtained are highly substituted. By comparison, Sample No. C-2 has a significantly lower ethyl chloride efficiency and the product obtained thereby has a very low ethoxyl substitution. Thus, it is seen that both efficiency and substitution are enhanced using the process of this invention.

EXAMPLE 6

This example illustrates a two-stage process for preparing ethyl chloride wherein water is removed in the first stage of the ethylation reaction.

In a Parr reactor equipped with a condenser, a water trap and a means for recycling distilled diluent, are added 310 g of toluene, 54 g of cellulose, 59 g of a 73 weight percent aqueous sodium hydroxide solution (0.8 NaOH to cellulose ratio) and 191 g of ethyl chloride. This mixture is heated to 140° C. for about 1 hour. During this period an azeotropic mixture of toluene and water are distilled from the reaction mixture. This mixture is condensed and the organics returned to the reactor. $R_w$ in this period is 0.93. After 1 hour, 75.6 g of anhydrous NaOH are added to the reactor without cooling the reactor or allowing any of the contents to escape. Reaction mixture is then heated for 5 additional hours without additional water removal. The resulting product is analyzed as described in Example 1. The results of such analysis are reported as Sample No. 6 in Table III following.

EXAMPLE 7

Example 6 is repeated with the following changes.

A. The first stage reaction (before the second addition of sodium hydroxide to the reaction mixture) is 2 hours long;
B. The second stage reaction is 4 hours long; and
C. Only 64 g of sodium hydroxide are added to the second stage reaction.

The results obtained are as reported as Sample Nos. 7 in Table III following.

EXAMPLE 8

Example 6 is again repeated with the following changes.
A. The NaOH to cellulose ratio in the first stage reaction is 1.0;
B. The first stage reaction is 2 hours long;
C. The second stage reaction is 4 hours long; and
D. Only 65 g of sodium hydroxide are added in the second stage reaction.

The results obtained are as reported as Sample No. 8 in Table III following.

TABLE III

| Sample No. | Initial NaOH/ Cellulose Ratio[1] | 1st Stage Run (Hrs)[2] | $R_w^3$ | 2nd Stage NaOH/ Cellulose Ratio[4] | 2nd Stage Run (Hrs)[5] | Ethoxyl D.S.[6] | Ethyl Chloride Efficiency (%)[7] |
|---|---|---|---|---|---|---|---|
| 6 | 0.8 | 1 | 0.93 | 1.4 | 5 | 2.5 | 51.7 |
| 7 | 0.8 | 2 | 1.2 | 1.4 | 4 | 2.3 | 61.4 |
| 8 | 1.0 | 2 | 1.03 | 1.2 | 4 | 2.47 | 61.6 |

[1]Weight ratios of NaOH to cellulose at the start of the reaction.
[2]Length of first stage reaction (before second NaOH addition) in hours.
[3]Same as [1] in Table I. In these samples, all water removal is done in the first stage reaction.
[4]Weight ratios of second NaOH addition to cellulose.
[5]Length of second stage reaction in hours.
[6]Same as [3] in Table I.
[7]Same as [4] in Table I.

As can be seen from Table III, removal in water in only the first stage of a two-stage ethylation process results in excellent ethyl chloride efficiencies and excellent ethoxyl substitution. These good results are obtained even though $R_w$ in Sample Nos. 6-8 are significantly lower than those reported in Table II under Sample Nos. 2-5. It is believed that in the two-stage ethylation process the addition of anhydrous sodium hydroxide consumes water which remains in the cellulose following the distillation process. Therefore, less water needs to be removed in the distillation process in order to achieve improved efficiencies.

What is claimed is:

1. In an etherification process for preparing cellulose ethers wherein alkali cellulose is reacted with an etherifying agent which also reacts with water, the improvement comprising removing water by distillation, during the reaction, whereby the efficiency of the etherification reaction is improved.

2. The process of claim 1 wherein the etherification reaction is conducted in the presence of an inert organic diluent.

3. The process of claim 2 wherein the etherification reaction is conducted at a temperature of at least 100° C.

4. The process of claim 2 wherein the organic diluent and the water form an azeotropic mixture and water is distilled as an azeotrope with the organic diluent.

5. The process of claim 1 wherein the water is distilled continuously during the etherification reaction.

6. The process of claim 1 wherein the alkali cellulose contains water at the start of the etherification reaction and the weight ratio of water removed from the reaction to the water contained in the alkali cellulose at the start of the etherification reaction is at least about 0.6.

7. The process of claim 6 wherein said ratio is at least 1.0.

8. The process of claim 1 wherein alkali cellulose is prepared from about 0.8 to about 3.0 parts by weight of an alkali metal hydroxide per part by weight of cellulose and additional alkali metal hydroxide is added to the alkali cellulose during the etherification reaction.

9. The process of claim 1 wherein the etherifying agent comprises ethyl chloride.

10. The process of claim 4 wherein the etherifying agent is ethyl chloride.

11. The process of claim 8 wherein the etherifying agent is ethyl chloride.

12. The process of claim 8 wherein no water is removed following the addition of said additional alkali metal hydroxide.

13. In an etherification process for preparing cellulose ethers wherein alkali cellulose containing an amount of water is reacted with an etherifying agent which also reacts with water, the improvement comprising removing water by distillation during the reaction, whereby the weight ratio of water removed from the reaction to the water contained in the alkali cellulose at the start of the etherification reaction is at least about 0.3.

14. The process of claim 13, wherein said weight ratio is at least about 0.6.

15. The process of claim 14, wherein said weight ratio is at least about 1.0.

* * * * *